(12) United States Patent
James et al.

(10) Patent No.: US 11,674,085 B2
(45) Date of Patent: Jun. 13, 2023

(54) FIRE INSULATION MATERIAL

(71) Applicant: Firespray International Limited, Essex (GB)

(72) Inventors: Brian James, Essex (GB); Mark Newton, Essex (GB)

(*) Notice: Subject to any disclaimer, the term of this patent is extended or adjusted under 35 U.S.C. 154(b) by 137 days.

(21) Appl. No.: 17/379,865

(22) Filed: Jul. 19, 2021

(65) Prior Publication Data
US 2022/0010210 A1 Jan. 13, 2022

Related U.S. Application Data

(63) Continuation of application No. 14/352,767, filed as application No. PCT/GB2012/052582 on Oct. 18, 2012, now Pat. No. 11,066,603.

(30) Foreign Application Priority Data

Oct. 19, 2011 (GB) .................................. 1118055
Aug. 22, 2012 (GB) .................................. 1214971

(51) Int. Cl.
| | |
|---|---|
| C09K 21/02 | (2006.01) |
| C04B 28/02 | (2006.01) |
| C04B 28/04 | (2006.01) |
| C09K 21/14 | (2006.01) |
| F16L 57/04 | (2006.01) |
| F16L 59/00 | (2006.01) |
| F16L 59/14 | (2006.01) |
| C04B 111/00 | (2006.01) |
| C04B 111/28 | (2006.01) |

(52) U.S. Cl.
CPC .............. *C09K 21/02* (2013.01); *C04B 28/02* (2013.01); *C04B 28/04* (2013.01); *C09K 21/14* (2013.01); *F16L 57/04* (2013.01); *F16L 59/00* (2013.01); *F16L 59/145* (2013.01); *C04B 2111/00612* (2013.01); *C04B 2111/28* (2013.01); *Y10T 428/1317* (2015.01); *Y10T 428/266* (2015.01)

(58) Field of Classification Search
CPC ........ C09K 21/02; C09K 21/04; C04B 28/02; C04B 28/04; C04B 2111/00612; C04B 2111/28; F16L 57/04; F16L 59/00; F16L 59/145; Y10T 428/1317; Y10T 428/266
USPC ......................................................... 428/34.6
See application file for complete search history.

(56) References Cited

U.S. PATENT DOCUMENTS

| | | |
|---|---|---|
| 5,309,690 A | 5/1994 | Symons |
| 2006/0266263 A1 | 11/2006 | Giesemann |
| 2010/0197182 A1* | 8/2010 | Barzilai .................. E04B 1/942 524/8 |

FOREIGN PATENT DOCUMENTS

| | | |
|---|---|---|
| JP | H06114819 A | 4/1994 |
| JP | S63273692 A | 11/1998 |

(Continued)

*Primary Examiner* — Ling Siu Choi
*Assistant Examiner* — Ronald Grinsted
(74) *Attorney, Agent, or Firm* — Dykema Gossett PLLC

(57) ABSTRACT

A fire insulation precursor material formed of cement, in an amount of between 10-30% w/w; and an aluminium or magnesium hydroxide, huntite or hydromagnesite in an amount of between 60-90% w/w/. A fire insulation material is provided including the previously mentioned precursor material. Further described are methods of forming a fire insulation material and applications for such material in sheaths, duct coatings, cable trays and other elongate components.

16 Claims, 2 Drawing Sheets

(56) References Cited

FOREIGN PATENT DOCUMENTS

WO      2006/070960 A1    7/2006
WO      2013/057496 A2    4/2013

* cited by examiner

FIRE INSULATION MATERIAL

CROSS REFERENCE TO RELATED APPLICATIONS

This application is a continuation of U.S. application Ser. No. 14/352,767, filed 18 Apr. 2014 (the '767 application), now U.S. Pat. No. 11,066,603 B2, which is a national stage filing based upon international application no. PCT/GB2012/052582, filed 18 Oct. 2012 (the '582 application), which claims priority to Great Britain application no. 1214971.2, filed 22 Aug. 2012 (the '971 application) and claims priority to Great Britain application no. 1118055.1, filed 19 Oct. 2011 (the '055 application). The '767 application, the '582 application, the '971 application, and the '055 application are all hereby incorporated by reference in their entirety as though fully set forth herein.

FIELD OF THE INVENTION

The present invention relates to fire insulation materials and a process for making fire insulation materials.

BACKGROUND

Fire Insulation materials are required under a number of circumstances and come in many forms, such as panels and ducts or other conduits, to which certain fire insulation standards apply.

There are currently numerous panel products in the market, but these are often fitted with multiple layers and air gaps to achieve the required fire and insulation requirements, or use thick insulation material.

Recent changes to the European standard (EN1366) for ductwork require that all drop rods over 1.5 meters in length are insulated, to limit the elongation of the drop rod due to the temperature rise during a fire, and the possible stress this will put on the ductwork and penetrated walls.

The present invention addresses the need for improved fire insulation materials.

SUMMARY AND INTRODUCTORY DESCRIPTION OF THE INVENTION

In a first aspect the present invention relates to a fire insulation precursor material composed of:
(i) cement, in an amount of between 10-30% w/w; and
(ii) an aluminium or magnesium hydroxide, huntite or hydromagnesite, in an amount of between 60-90% w/w; and The material additionally may include:
(iii) a cracking resistant agent such as mica or fibres such as polypropylene, nylon or acrylic fibres, in an amount of between 2-10% w/w.

The present invention also relates to a fire insulation material comprising the precursor of the invention that has been admixed with water or other aqueous material. The fire insulation material may be in the form of a dry material or a wet material.

The invention also relates to a fire insulation component formed using the fire insulation material of the invention. The component may be, or form part of, a panel, duct, tray or drop rod.

The invention also relates to a method of making a fire insulation material formed of admixture of an aqueous material with a fire insulation precursor material including:
(i) cement, in an amount of between 10-30% w/w;
(ii) aluminium or magnesium hydroxide, huntite or hydromagnesite in an amount of between 60-90% w/w; and optionally
(iii) a cracking resistant agent such as mica or fibres such as polypropylene, nylon or acrylic fibres, in an amount of between 2-10% w/w.

The invention also relates to a laminate wall panel, having:
(i) an inner layer forming a fire insulation compound according to the invention, such as a fire insulation material of the invention
(ii) a layer of metallic foil substantially covering each face of the fire insulation compound, and
(iii) a layer of construction board substantially covering each outer face of the layers of metallic foil.

The invention also relates to a sheath for the protection of an elongate component from fire, having
(i) an outer substantially cylindrical metallic layer, and
(ii) an inner layer of a fire insulation compound, such as a fire insulation material of the invention, substantially filling the outer layer and having a hole for accepting the elongate component to be protected.

SPECIFIC DESCRIPTION OF THE INVENTION

Figure 1:
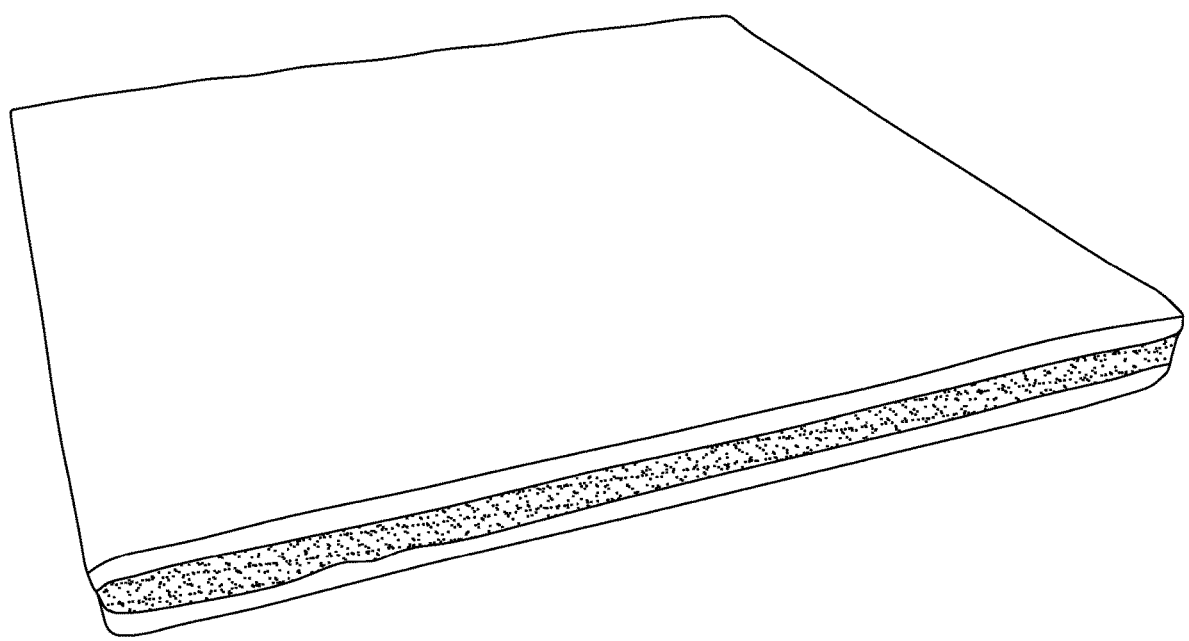
FIG. 1 shows a particular embodiment formed of layers of plaster board, foil, fire insulation compound, foil, and plaster board.

The present invention relates in one embodiment to a fire insulation precursor material which can be used to make a fire resistant material. In one embodiment the precursor is formed of a cement, an aluminium or magnesium hydroxide and optionally a cracking resistant agent. The precursor material generally takes the form of a dry mix, to which is added an aqueous solution such as water to produce a mortar which then hardens and which may be used for fireproofing and in the manufacture of different fireproofing products.

The fire insulation material of the invention is in one aspect able to provide fire insulation to comply with a UK or EU standard relevant for the use of the material in question, and/or provide at least one hour fire resistance, such as 1.5 or 2 hours fire resistance, for example provides fire resistance in accordance with BS EN1366 for drop rods or panels. Certain standards may require testing to be carried out in combination with other fire resistant materials.

The cement is provided in an amount of between 10-30% w/w such as 10-25% w/w such as 10-20% w/w such as 15-18% w/w, such as 15.5%, 16%, 16.5%, 17% or 17.5% w/w of the precursor. In one embodiment the cement is 16.3% by weight of the precursor, +/−0.5% w/w.

Suitable cements include Castle OPC, Blue Circle OPC, Cemex OPC, Dudmans OPC, Lafrarge General Purpose or multicrete type cements.

The aluminium hydroxide or magnesium hydroxide is provided in an amount of between 60-90% w/w, such as 65-85% w/w of the precursor, such as 68-88% w/w, such as 70%, 72%, 74%, 76%, 78%, 80%, 82%, 84%, or 86% by weight of the precursor. In one embodiment the hydride is 78.3% by weight of the precursor, +/−0.5% w/w.

Magnesium hydroxide may be used, for example, where a higher activation temperature is required.

A cracking resistant agent, such as mica or fibres such as polypropylene, nylon or acrylic fibres, may be provided. When provided this is suitably provided in an amount of between 2-10% w/w of the precursor 4-6% w/w, such as 4.5%, 5% or 5.5% by weight of the precursor. In one embodiment the agent is 5.2% by weight of the precursor +/−0.5% w/w.

In one embodiment the agent is Mica, suitably in the form of a powder or flakes.

In one embodiment the precursor or the fire insulation material may be provided having a thickner in an amount of between 0.1-0.3% w/w of the precursor. In one embodiment the thickner is provided in an amount of between 0.1-0.3% w/w, such as 0.15%, 0.2%, 0.25% by weight of the precursor. In one embodiment the agent is 0.2% by weight of the precursor +/−0.5% w/w. In one embodiment the thickner is a nonionic, water soluble polymer such as Hydroxethyl Cellulose (HEC) or any other thickening agent.

In one embodiment the fire insulation precursor material is a dry mix composed of the following:

| | |
|---|---|
| Ordinary Portland cement | 16.3% by dry weight |
| Aluminium Trihydrate | 78.3% by dry weight |
| Mica | 5.2% by dry weight |
| HEC Thickener | 0.2% by dry weight |

A precursor of the invention may be composed of additional cement additives, such as cement compatible polymers. Suitably additives able to improve any one or more or workability, adhesion flexibility and/or water resistance. Suitable additives include wet resins such as Stryene Butadiene resins, or VINNAPAS® polymer powders and dispersions (e.g. VINNAPAS products Wacker Chemie AG) which hydrate on the addition of an aqueous solution to improve the mechanical properties, and/or adhesion and/or flexibility of the fire insulation material.

In one embodiment the precursor material is mixed with an aqueous material, such as water, to allow a fire insulation material to be produced. The invention thus relates to a fire insulation material using a precursor of the invention that has been admixed with water or other aqueous material. The fire insulation material may be provided in wet form, or in a dried form after the water or other aqueous solution has been removed or has evaporated.

Thus the invention also relates to a fire insulation material or precursor material of the invention formed of a polymer in an amount sufficient to provide improved mechanical properties, adhesion and/or flexibility of the material, and to a fire insulation material or precursor material of the invention including styrene butadiene in an amount sufficient to provide improved mechanical properties, adhesion and/or flexibility of the material, when compared with the material without the polymer.

In one embodiment the fire insulation material may be sprayable prior to hardening.

In one aspect a hardener, such as calcium aluminate cement may be used to increase the speed at which the fire insulation material sets, and may be included as a component part of the precursor or added during the production of the fire insulation material from the precursor. The hardener may be added at a level of approximately 2-5% by weight of total weight of dry precursor mix, either added to the precursor, or added into a wet mix, to improve drying time.

Processes for Manufacture

In one embodiment the dry powder precursor is made by simple admixture of the dry powder components in the amounts disclosed herein.

In one embodiment the fire insulation material is made by addition of an aqueous solution to the precursor followed by mixing.

Thus the invention relates to a method of making a fire insulation material formed of admixture of an aqueous material with a fire insulation precursor material including:
 (i) cement, in an amount of between 10-30% w/w;
 (ii) aluminium or magnesium hydroxide huntite or hydromagnesite, in an amount of between 60-90% w/w; and optionally
 (iii) a cracking resistant agent such as mica or fibres such as polypropylene, nylon or acrylic fibres, in an amount of between 4-6% w/w.

In one embodiment a thickner in an amount of between 0.1-0.3% w/w of the precursor may also be added.

The quantities of the individual components may be any disclosed herein.

In one embodiment water is added in an amount of between 10-50% by weight of the weight of the precursor. The person skilled in the art will be able to adjust quantities of water to make a mortar with properties suitable for different uses, e.g. for spraying or delivery in other ways.

In one embodiment a cement additive may be added, such as those described herein, for example in an amount of 2-5% of total weight of dry mix.

In one method the fire insulation precursor formed of cement, aluminium or magnesium hydroxide, a cracking resistant agent and thickner, is added to a water/Styrene Butadiene(SBR) combination blended 50/50 water/styrene Butadiene to make a slurry. A general mix might be 20 Kg dry powder to 8.26 Kg of water/SBR, but a variation in the water mix can yield different consistencies for spray, pouring and trowel applications. The Styrene Butadiene suitably is in an amount to improve the mechanical properties, adhesion and flexibility of the cement mix.

These ratios may be varied, and for example ratios of 75:25 water/SBR have also been tested successfully. Thus the ratio of water to SBR is, in one aspect, from 50:50 to 75:25, such as 55:45; 60:40, 65:35, or 70:30. The invention is not limited to these ratios and the skilled person will be able to modify the ratio in accordance with the desired spraying and pouring properties as mentioned above.

In another aspect the method include additionally adding a hardener, such as calcium aluminate cement to increase the speed at which the mortar sets.

In another embodiment the fire insulation material prepared according to the methods described herein is further used in the preparation of a panel or a sheath for the protection of elongate components from fire, or used in the preparation or coating of a duct or cable tray.

The fire insulation material may be provided or used in combination with other fire insulation products such as ceramic fibres or mineral wool or aluminium foil.

Further embodiments of the invention relate to fire insulation components composed of the fire insulation material described hereinbefore, or a similar material, which materials are generally referred to as fire insulation compounds. For the avoidance of doubt reference to a fire insulation compound includes the specific fire insulation materials described above, but is not limited to such materials and may be a different material. In one aspect a fire insulation compound including cement or gypsum, suitably in an amount sufficient to provide fire insulation for at least one hour, suitably under BS EN1366. The compound may include other materials such as a water releasing material.

The fire insulation compound may be, or may include, the fire insulation material as disclosed herein.

In one aspect the invention relates to any component, such as a building or structural component, which may be required to have fire resistant properties, such as ductwork, a cable tray, a drop rods or panel, and which include the fire insulation material of the invention. The fire insulation material of the invention may be sprayed, poured, manually applied, coated or made an integral part of such a component.

In one embodiment the invention relates to a laminate panel having a layer of a fire insulation compound and at least one other layer. The fire insulation compound is a solid material, for example may be the fire insulation material as described hereinbefore, but is not limited to that material. The compound may be a cement-based material included a water-releasing material, but other compounds may be selected as appropriate for each application. The compound works in conjunction with the other layers of the panel to provide fire insulation properties.

In a particular embodiment the panel includes a layer of the fire insulation compound and an outer layer of a construction board material. For example, the construction board may be gypsum board, plaster board, calcium silicate board, or glass fibreboard. A layer of metal foil may be positioned between the two layers to provide additional fire insulation. The metallic foil may be, for example, an aluminium foil with a thickness in the range 20-100 microns, such as 40, 50 or 60 microns thick. Any suitable metal or metallic compound may be utilised to form the foil layer to provide the required fire-insulation. A foil and/or outer layer may be provided on one or both sides of the fire insulation material.

FIG. 1 shows a particular embodiment having layers of plaster board, foil, fire insulation compound, foil, and plaster board.

The panel may be utilised to form partition walls by attachment to conventional stud-work. The panels may be designed such that a single panel meets the requirements of the fire standards thereby providing a thinner wall that is provided with conventional materials. The panels may also be utilised to product areas requiring fire protection, for example walls, general areas, or steel columns. In certain embodiments, the fire insulation compound of the panel may be more than 3 mm thick, such as more than 4 mm, 5 mm, or 6 mm thick. The fire insulation compound may be 7 mm, 8 mm, 9 mm, 10 mm thick, or more. In one embodiment the fire insulation compound is 6-8 mm in thickness.

The fire insulation compound may be formed into the required panel sizes by pouring into a frame or conveyor system. Further layers may be bonded to the surfaces by placement while the insulation compound cures, or utilising additional compound after cure as an adhesive. Alternatively any suitable high-temperature adhesive, such as a sodium silicate, may be utilised. Where multiple layers of materials are utilised each layer may be joined using any appropriate material.

Figure 2:
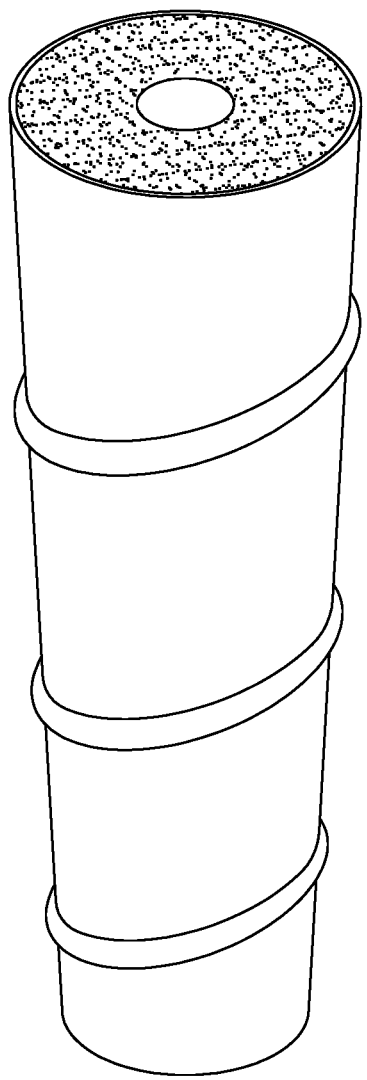
FIG. 2 shows an embodiment of a sheath formed of an outer metallic layer and an inner layer of fire insulation compound.

In a further embodiment a protective sheath may be formed of the fire insulation compound to protect, in particular, drop rods supporting ductwork. FIG. 2 shows an embodiment of a sheath having an outer metallic layer and an inner layer of fire insulation compound. A hole is formed in the centre of the fire insulation compound in which is positioned the drop rod. The sheath of FIG. 2 is formed in a cylindrical cross-section, but other shapes may be utilised.

Sheaths as shown in FIG. 2 may be utilised to protect drop rods used for supported duct work from ceilings, or any type of elongate component (e.g. hangers, support rods, elongate connectors) which require protection from fire.

The outer metallic layer may be utilised as a former during production of the device, and may also contribute to the fire protection provided by the sheath. A typical layer may be 0.3-3 mm thick and formed of galvanised or stainless metal, such as stainless steel, or a coated metal such as coated steel. In certain embodiments aluminium may also be used in the metallic layer. In a particular embodiment the outer diameter is approximately 50 mm and the metal has a 0.6-1 mm sheet thickness. A typical drop rod diameter is 12 mm.

The hole in the sheath may be sized to form an interference fit with the drop rod being protected. Where the drop rod is threaded the rod may be screwed through the hole. Alternatively the hole may be sized larger than drop rod diameter with which it is intended to be utilised. Metal end caps may be utilised at both ends of the sheath to contain the fire insulation compound and provide a seal at both ends. The end caps may be sealed to the drop rods and sheath to provide an enclosed space surrounding the drop rod which is isolated from the surrounding environment.

The sheath of FIG. 2 may be formed by pouring the fire insulation compound into the outer metal layer and subsequently drilling the hole once the compound has cured. Alternatively a mould may be utilised to form the hole during curing.

In one aspect the approximate weight of the sheath per meter is 3-3.5 Kg such as 3.25 Kg.

Where the term substantially 'cylindrical' is used in this document it is not intended to be restrictive to only objects having a perfectly circular cross-section, but is also intended to include objects having an equivalent function. For example, objects with a square, hexagonal, etc, cross section are intended to be encompassed by the term 'cylindrical' provided they provide substantially the same technical function.

In a further aspect the invention relates to ductwork coated, or partially coated, with a fire insulation material as disclosed herein. For example, the ductwork may include a layer of 1 or 2 mm of fire insulation material that has been sprayed on to the duct to produce a duct that has fire resistant properties. The ductwork may be for applications such as ventilation and smoke extraction.

The invention also relates to a cable tray sprayed or otherwise coated, in part or wholly, with the fire insulation material.

In all cases where the a fire insulation material is applied to a product, the product can be sprayed and the required thickness built up in 2-3 layers, or it can be applied by trowel, or by manufacturing slabs of the fire resistant material in frames and subsequently cutting them to size and fixing to the product.

The invention relates to the use of the fire insulation material of the invention in the manufacture of components such as a building component, which may be required to have fire resistant properties, such as ductwork, cable trays, drops rods and panels. The fire insulation material of the invention may be sprayed, poured, manually applied, coated or made an integral part of such a component.

The fire insulation materials and components of the invention may be used in combination with other insulation materials, for example rockwool mineral fibre insulation at 105 Kg/m3 density, which may be for example 50-150 mm, such as 50 or 100 mm.

The present invention is illustrated with the following examples which are not limiting upon the invention.

EXAMPLE 1

Method of Manufacture
A dry mix is formed of the following:

| | |
|---|---|
| Ordinary Portland cement | 16.3% |
| Aluminium Trihydrate | 78.3% |
| Mica | 5.2% |
| HEC Thickener | 0.2% |

The dry raw materials are blended together in a large mixer, generally 1000 Kg batches. These can be supplied in 20-25 Kg bags.

The product can be mixed to a mortar in a number of different ways, by paddle mixer in small 20-30 Kg lots or on a standard cement mixer in slightly larger volumes.

The dry powder is added to a water/Styrene Butadiene blended 50/50 by weight to make a slurry. A general mix would be 20 Kg dry powder (such as a fire insulation precursor material of the invention) to 8.26 Kg of water/SBR, (the latter in a 50:50 mixture by weight), but a variation in the water mix can yield different consistencies for spray, pouring and trowel applications. The SBR acts to improve the mechanical properties, adhesion and flexibility of the cement mix.

The final product is referred to as BW18 in the Examples herein.

Use on Ductwork

The product is sprayed using a suitable gun and pump, to a thickness of 2 mm. The ductwork may be for applications such as ventilation and smoke extraction.

Use in Cable Trays

The product can be sprayed and the required thickness built up in 2-3 layers, or it can be applied by trowel, or by manufacturing slabs of the product in frames and subsequently cutting them to size and fixed to the ductwork using the cement mixture as a mortar, to a total thickness of 8 mm. 50 mm-150 mm Insulation (105 Kg/m3 mineral fibre slab) is then suitably fixed to the dried mortar, such as 50, 100 or 150 mm.

Panel Construction

The core of the panel contains a combination of cement, a resin (Styrene Butadiene), mica and aluminium hydroxide (alumina trihydrate), which in a fire situation acts to cool the outer panels and improve the overall fire insulation performance.

The cementitious core is approx 6-8 mm thick, with, but not limited to, a gypsum, plaster, calcium silicate or glass fibreboard of variable thickness on either side, optionally with an aluminium foil layer between the board and the core. Aluminium foil where used is approx 50-micron thickness. The boards may be Fireline: A fire rated plasterboard, approx 12.5 mm thick; Glasroc: a glass reinforced plasterboard, 6 or 10 mm thick; Supalux: A calcium silicate board, 6 or 10 mm thick Panels can be manufactured in a slab form of any size or thickness using a frame or conveyor system, and then cut to size.

Drop Rod Protection

In the present invention the mortar can be poured into a suitable sized, spiral or hollow metal sheath, e.g. 50 mm diameter, with a removable circular core in the centre of, for example approx 12 mm. Once the mortar has begun to set, the circular core is removed and the mortar will remain in place, and continue to dry. In one aspect the sheath may have a diameter of up to 100 mm. In one aspect the sheath may have a core of up to 22 mm. In one aspect the minimum thickness of the cementitious fire insulation material is 15 mm, 16 mm, 17 mm, 18 mm, 19 mm, 20 mm or more.

EXAMPLE 2: FLAMEBAR DUCK TESTS

EN1366 Part 1 Duct tests—External Tests at Exova Warrington Fire: BW18 was coated at ~2 mm thick coating onto a duct which was insulated with 50 mm or 100 mm of FP110 insulation (having rockwool mineral fibre insulation at 105 Kg/m3 density). The following tests have been carried out:

Fire Inside Vertical Duct—target 1-hour insulation, 50 mm insulation. July 2011, Test Report 198946.

Fire Inside Vertical Duct—target 2-hour insulation, 100 mm insulation. June 2011, Test Report 198945.

Fire Outside Vertical Duct—target 2-hour insulation, 50 mm insulation. June 2011, Test Report 198945.

Fire Inside Horizontal Duct—target 1-hour insulation, 50 mm insulation. March 2011, Test Report 198943.

Fire Inside Horizontal Duct—target 2-hour insulation, 100 mm insulation. November 2010, Test Report 193176.

Fire Outside Horizontal Duct—target 2-hour insulation, 50 mm insulation.

By way of example, the following specific parameters were tested in test 193176:

The specimen duct had nominal cross sectional dimensions of 1000 mm wide by 250 mm high and was nominally 4000 mm long within the furnace chamber and 2500 mm outside the furnace. The specimen duct ducting was formed from 0.8 mm thick galvanised mild steel and forming a BW18 coating on its outside surfaces. The nominal thickness of the BW18 was 2.0 mm.

The duct passed from the furnace chamber through an aperture of overall dimensions 1120 mm wide by 370 mm high within a nominally 150 mm thick aerated concrete blockwork wall. The area between the duct and surrounding wall was sealed using mineral wool, friction fitted around the duct in conjunction with 50 mm thick foil faced mineral wool slab adhered and screw fixed to each face of the wall. The duct was insulated with two layers of mineral wool, each 50 mm thick referred to as FP110. Each layer was butt jointed and with the joints in each layer staggered by 150 mm. The duct was suspended within the furnace chamber using M10 drop rods and steel channel supports. The specimen duct was connected to an extraction fan, which maintained an air velocity of 3 m/s within the duct (excluding the 'fan off' periods required by the Standard) throughout the test duration.

An insulation performance of 180 minutes was achieved after which the test was discontinued.

BS476 Part 24

6 mm of BW18 on ductwork with a foil face, fire inside, gave 46 minutes insulation. (Warrington Report 138638)

6 mm of BW18 on ductwork with a foil face, fire outside, gave 76 minutes insulation. (Warrington Report 138639)

Cable Tray Testing

Cable tray test witnessed by Exova Warrington Fire at Firespray Test lab WF Assessment report 197644, October 2010.

8 mm of BW18, with 50 mm of lagging maintained the temperatures inside the duct below 200° C. for 2 hours, using the ISO 834 time temperature curve in the furnace in a fire outside scenario.

Panel Testing:

These were tested either side of a BW18 core, with 0.05 mm foil between the core and the boards.

|  | 6 mm Supalux | 9 mm Supalux | 10 mm Glasroc | 12.5 mm Fireline |
|---|---|---|---|---|
| BW18 Core Weight (Kg/m²) | 13.7 | 13.16 | 13.04 | 14.4 |
| Average Insulation Failure time (Minutes) | 50 | 56 | 94 | 110 |
| Total Weight of panel (Kg/m²) | 26.5 | 32 | 31.2 | 36 |
| Observations | *1 | *1 | *2 | *2 |
| Test Number and Date | 657 May 2011 | 660 June 2011 | 659 June 2011 | 663 June 2011 |

*1 - The 50 and 56 minute times would likely result in a 1 hour pass on a large-scale external test.
*2 - Early failure of the panel due to the furnace side panel losing strength and falling into furnace; This could be improved by adding a central stud to reduce the current span of 1000 mm to 600 mm, and tests showed that 2 hours is achievable, particularly with the Fireline board.

Additional Cable tray test carried out by Exova Warrington Fire include:

Report No 309780, November 2011: 8 mm of BW18, with 50 mm of insulation, tested successfully for 2 hours to EN1366-5:2010

Report No 316386, March 2012: 8 mm of BW18, with 100 mm of lagging maintained the temperatures of cables inside the duct below 180° C. (plus ambient) for 2 hours, when subjected to the time/temperature curve and performance criteria of EN1363-1 within the furnace in a fire outside scenario.

Hanger Drop Rod Protection:

All 10 mm diameter drop rod samples were testing in the Firespray Furnace, using the ISO 834 time temperature curve, with 56 Kg of weight at the end of the drop rod. A 50 mm diameter sheath, with 12 mm core for drop rod was employed.

| SAMPLE | ELONGATION (mm) | Date and Test No. |
|---|---|---|
| Non-insulated | 23-37 mm | February 2010. 651 |
| Flamebar Hanger protection | 6, 10 and 12 mm | June 2011 663 and 664 |

While the above description constitutes the preferred embodiment of the present invention, it will be appreciated that the invention is susceptible to modification, variation and change without departing from the proper scope and fair meaning of the accompanying claims.

The invention claimed is:

1. A method of making a fire insulation material comprising mixing an aqueous material with a fire insulation precursor material comprising:
   (i) a cement, in an amount of between 10-30% w/w of the precursor; and
   (ii) aluminium hydroxide, magnesium hydroxide, huntite, or hydromagnesite in an amount of between 60-90% w/w of the precursor.

2. The method according to claim 1, wherein the precursor material further comprises a cracking resistant agent.

3. The method according to claim 2, wherein the cracking resistant agent comprises one or more of mica, polypropylene fibres, nylon fibres, and acrylic fibres, in an amount of between 2-10% w/w of the precursor.

4. The method according to claim 1 further comprising forming the fire insulation material into a cable tray, a duct, a panel, or a sheath.

5. The method according to claim 1, wherein the precursor material further comprises a cement additive that improves one or more of workability, adhesion, flexibility, and water resistance.

6. The method according to claim 5, wherein the cement additive comprises styrene butadiene, suitably in the form of a wet resin.

7. The method according to claim 5, wherein the cement additive comprises a polymer powder or dispersion.

8. The method according to claim 1, wherein the precursor material further comprises a hardener.

9. The method according to claim 1 further comprising
   forming the fire insulation material into an inner layer of a laminate wall panel, the laminate wall panel comprising a first face and a second face;
   adding a layer of metallic foil to at least one of the first face and the second face; and
   adding a layer of construction board to the layer of metallic foil.

10. The method according to claim 1, wherein the inner layer has a thickness of 6-8 mm.

11. The method according to claim 1 further comprising:
    forming the fire insulation material into an inner layer/core of a sheath, wherein the sheath inner layer/core is surrounded by a metallic, cylindrical outer layer, and further wherein the sheath inner layer/core has a sheath longitudinal axis; and
    forming an elongate hole along the sheath longitudinal axis and through the fire insulation material, whereby the sheath inner layer/core is configured to receive an elongate component.

12. The method according to claim 11 further comprising attaching end-caps to close the ends of the cylindrical outer layer, at least one of the end caps comprising holes to allow the passage of the elongate component through the sheath.

13. The method according to claim 11, wherein the outer diameter of the cylindrical outer layer is in the range of 40-100 mm.

14. The method according to claim 11, wherein the diameter of the elongate hole is in the range of 10-15 mm.

15. The method according to claim 1 further comprising applying a coating of the fire insulation material onto a duct.

16. The method according to claim 1 further comprising applying a coating of the fire insulation material onto a cable tray.

* * * * *